United States Patent [19]
Uttenthaler

[11] Patent Number: 4,607,714
[45] Date of Patent: Aug. 26, 1986

[54] RADIATOR-FAN SYSTEM, PARTICULARLY FOR BUSES HAVING REAR-MOUNTED ENGINES

[75] Inventor: Josef Uttenthaler, Hettenshausen, Fed. Rep. of Germany

[73] Assignee: M.A.N. Maschinenfabrik Augsburg-Nurnberg Aktiengesellschaft, Fed. Rep. of Germany

[21] Appl. No.: 520,827

[22] Filed: Aug. 5, 1983

[30] Foreign Application Priority Data

Oct. 5, 1982 [DE] Fed. Rep. of Germany ....... 3236794

[51] Int. Cl.4 .............................................. B60K 11/04
[52] U.S. Cl. .................................. 180/68.1; 180/68.4; 417/362; 474/136; 474/138
[58] Field of Search ..................... 180/68.1, 68.2, 68.4; 474/117, 136, 138; 417/362, 429; 123/41.49

[56] References Cited

U.S. PATENT DOCUMENTS

| 1,861,133 | 5/1932 | Reid | 474/138 |
|---|---|---|---|
| 1,882,319 | 10/1932 | Gurney | 180/68.2 X |
| 2,204,926 | 6/1940 | Clingerman | 180/68.1 |
| 2,578,662 | 12/1951 | Bader | 474/136 X |
| 3,203,499 | 8/1965 | Bentz et al. | 180/68.4 |
| 3,365,968 | 1/1968 | Merriman | 474/138 X |
| 4,186,693 | 2/1980 | Thien et al. | 180/68.4 X |

FOREIGN PATENT DOCUMENTS 874295  8/1942  France ............................... 180/68.1

Primary Examiner—John A. Pekar
Assistant Examiner—Michael Mar
Attorney, Agent, or Firm—Scully, Scott, Murphy & Presser

[57] ABSTRACT

A radiator-fan system, particularly for buses with rear-mounted engines, with the system being fitted with a bevel gear drive and notwithstanding larger dimensions, being accommodated in the restricted space of the engine compartment of the vehicle.

6 Claims, 4 Drawing Figures

RADIATOR-FAN SYSTEM, PARTICULARLY FOR BUSES HAVING REAR-MOUNTED ENGINES

BACKGROUND OF THE INVENTION

1. Field of the Invention

The present invention relates to radiator-fan systems and, more particularly, relates to radiator-fan systems for buses of the type having rear-mounted engines.

2. Discussion of the Prior Art

Generally, for buses having rear-mounted engines, the radiator-fan system is mounted adjacent to the engine so as to face in a direction transverse to the direction of travel of the vehicle. Normally, the fan draws cooling air through a suitable part provided in a panel of the bus and through a duct whereupon, subsequent to passing the fan, the air will flow towards the rear panel of the bus and escape into the open from below a rear wall of the bus.

It is readily apparent that in view of the positioning of the engine and the generator, as well as the maximum permissible width of the bus, limitations are imposed on the size of the radiator and fan, and consequently on the cooling capacity, which becomes disadvantageously noticeable, particularly in subtropical and tropical climates.

In that situation it is not adequate to merely correspondingly increase the dimensions of the currently employed radiator-fan system and to arrange it in a changed position which would facilitate accommodation of the spatially enlarged system, inasmuch as the direct V-belt drive of the fan of the present system prevents the use of any other spatial arrangement of the system relative to the drive motor or engine, in comparison with the generally usual spatial system arrangement.

SUMMARY OF THE INVENTION

Accordingly, it is a primary object of the present invention to increase the cooling capacity not only through accommodating of a larger-dimensioned radiator-fan system in the limited space of the engine compartment of the vehicle, but by additionally providing a new drive arrangement for this system which allows for the transmission of power between the system and the drive motor or engine notwithstanding the modified spatial relationship therebetween.

It is a more specific object of the present invention to provide a radiator-fan system, particularly for buses having rear-mounted engines, in which the fan of the system is driven through the intermediary of V-belts. The inventive system distinguishes itself by the V-belt drive of the fan being indirectly coupled with the associated drive motor or engine through a bevel gear drive. The bevel gear drive effects a displacement of the input shaft of the fan through an angle of 90°, thereby facilitating the radiator-fan system to be arranged, in a direction extending along the direction of vehicle travel, in a side panel of the vehicle in proximity to its rear end and to be driven by the drive motor or engine.

Pursuant to a preferred aspect of the present invention, the transmission of the power from engine to the bevel gear drive is effected through a V-belt drive at the motor end, a jackshaft and a cardan shaft, whereby the drive motor, as well as the vehicle engine itself, can be a separate motor, such as advantageously, an electric motor.

It is particularly advantageous to drive an aggregate constituted of two fans with associated radiators through a single bevel gear drive. In comparison with a system having only a single fan and radiator with the same capacity, this affords the advantage of a more favorable spatial dimensioning (length greater than height), which renders even easier the accommodation of the system in the engine compartment of the vehicle. It is also conceivable to employ more than two fans and associated radiators.

In another aspect of the invention, a further cardan shaft can also be coupled to the bevel gear drive on a side opposite the input end, and which is connection with the air-conditioning compressor of the vehicle. An arrangement of this type provides the advantage in that the technical requirements are quite economical for the drive of the air-conditioning compressor.

BRIEF DESCRIPTION OF THE DRAWINGS

The invention is now described in greater detail hereinbelow in conjunction with the accompanying drawings, which illustrate a preferred embodiment of the radiator-fan system of the present invention; in which.

DETAILED DESCRIPTION

Figure 1:
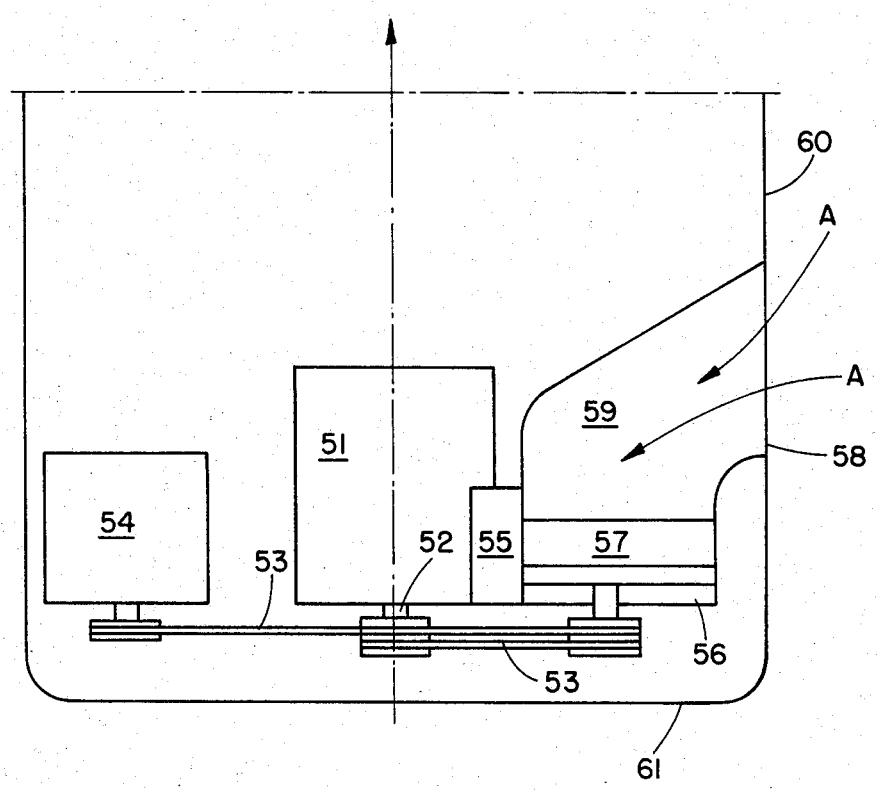
FIG. 1 schematically illustrates in a plan view a prior art radiator-fan system for buses having rear-mounted engines.

On buses having rear-mounted engines the radiator-fan system is generally arranged adjacent to the engine in a direction extending transverse to the direction of vehicle travel; referring to FIG. 1 showing a plan view of the engine compartment in the rear of a vehicle. An air conditioning compressor 54 and a generator 55, as well as a fan 56 which is arranged behind the radiator 57, are driven from the crankshaft 52 of the vehicle engine 51 through the intermediary of V-belts 53. The fan draws cooling air in the direction of arrows A through a port 58 provided in the right-hand panel 60 of the bus, and through a duct 59. After passing the fan, the air stream flows towards the rear panel 61 of the bus and escapes into the open from below the rear wall of the bus.

Figure 2:
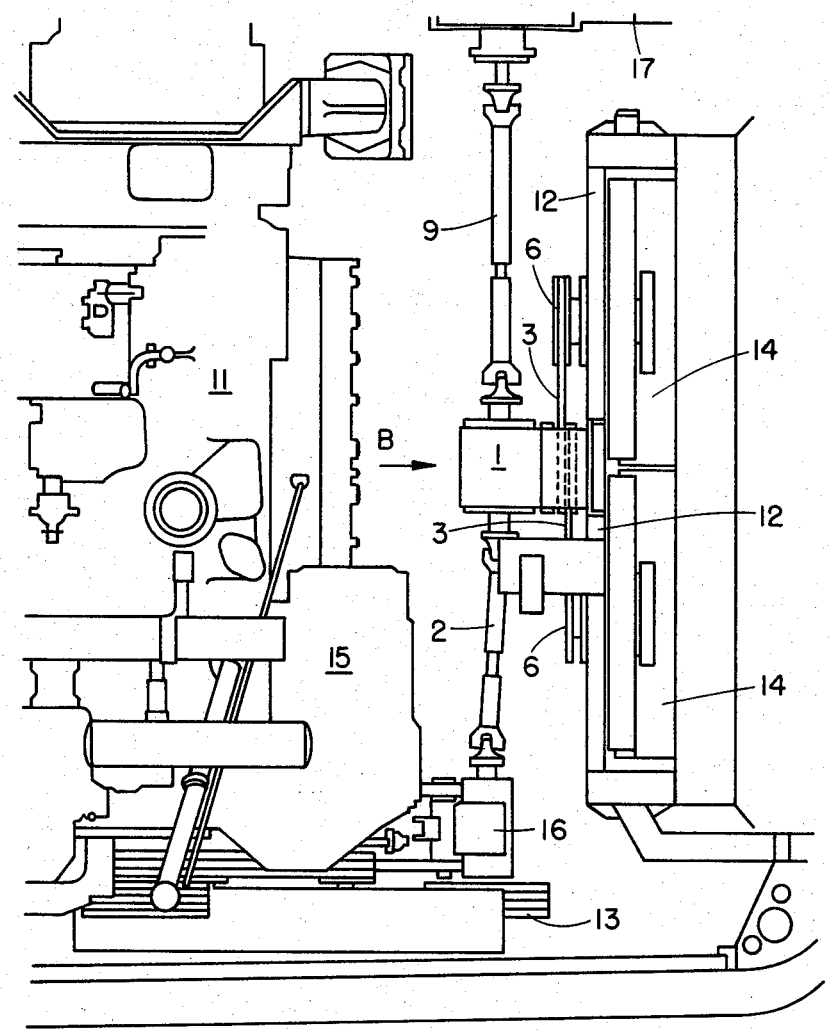
FIG. 2 is a plan view showing the general arrangement of a system of a radiator and two fans in the right-hand panel in the rear end of a bus, and the power transmission elements connecting the system with the drive motor.

The inventive system as shown in FIG. 2 is constituted of two fans 12 with associated radiators 14 and is installed in the engine compartment in the right-hand side panel of the rear end of the bus, and receives its motive drive from the belt pulley of a bevel gear drive 1 through the fan drive pulleys 6 and the V-belts 3. The bevel gear drive, in turn, is connected with the drive motor through the input cardan shaft 2, the jackshaft 16 and the V-belt drive 13, wherein the drive motor, in this instance, is the vehicle engine 11. It can be ascertained that this radiator-fan system not only affords a cooling surface which is considerable larger than that of prior art systems, but that it also produces improved air exhaust flow conditions because of its novel arrangement. In prior art systems, as in FIG. 1, the air exhausted from the fan impinges against the barrier formed by the rear wall 61 of the bus, whereas in the arrangement pursuant to the present invention, the outflowing air can flow unhinderedly across the engine compartment, and thereby exert an additional cooling effect over the outer surfaces of the vehicle engine and other heated up components which are arranged in the engine compartment.

Coupled to the side of the bevel gear drive 1 which is located opposite the input cardan shaft 2 is the cardan shaft 9 which drives the air-conditioning compressor. The more economical technical demands of such an arrangement in comparison with the heretofore usual arrangement of the air-conditioning compressor 54 as shown in FIG. 1 is clearly evident.

Advantageously, the bevel gear drive 1 affords various gear ratio capabilities so as to be able to drive the fan at different rotational speeds.

Figure 3:
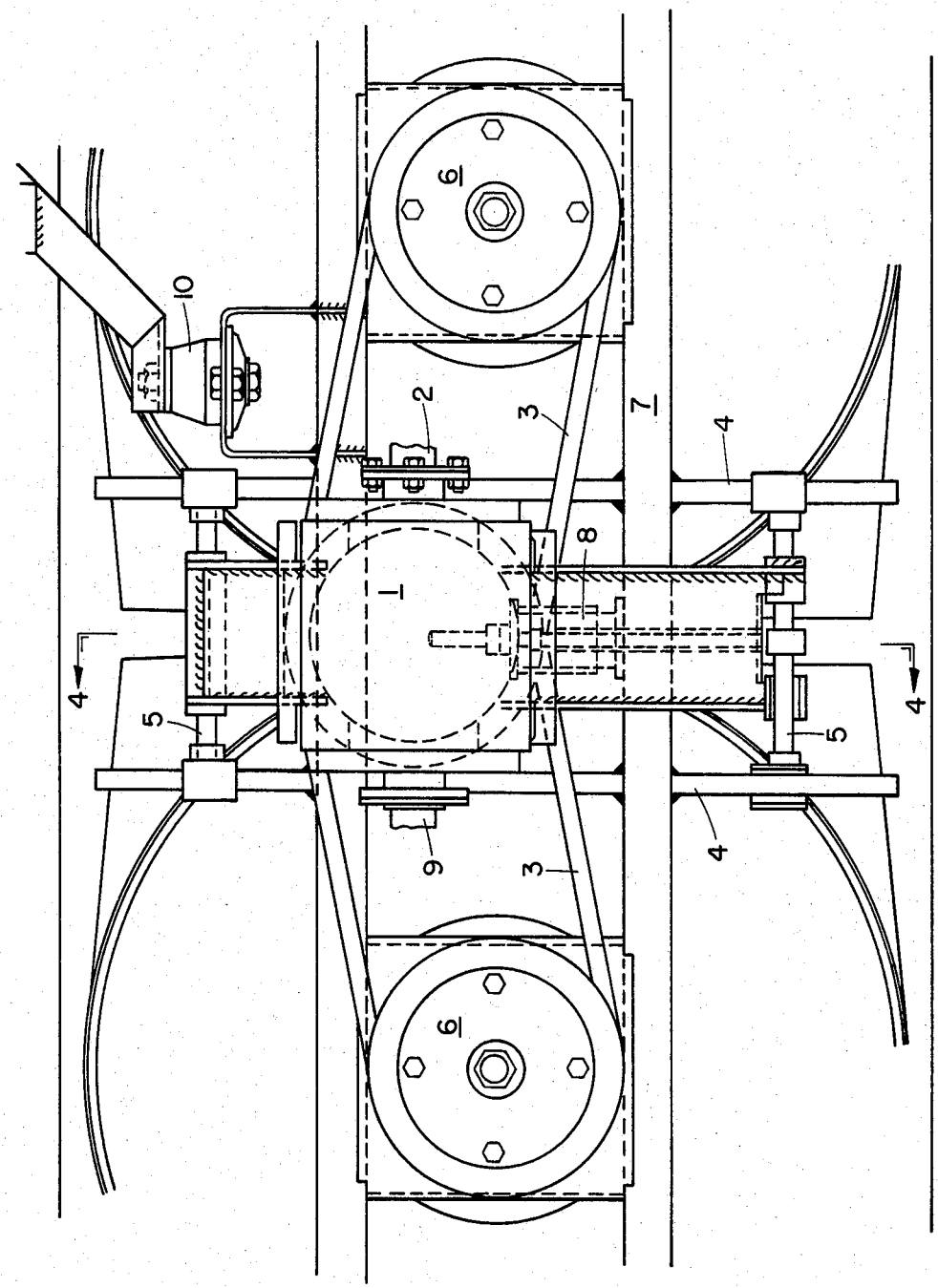
FIG. 3 illustrates a view of a schematic arrangement showing the system of FIG. 2 in the direction of arrow B in FIG. 2.
Figure 4:
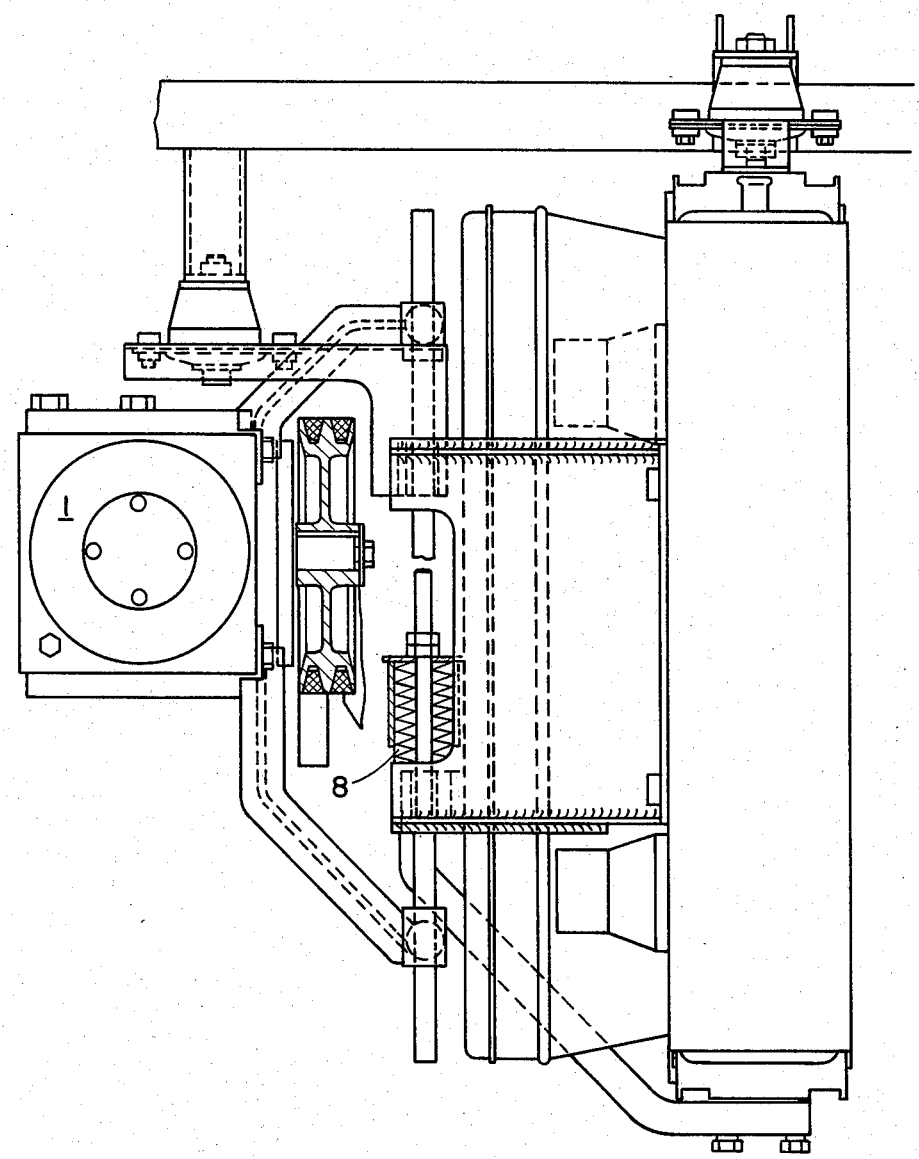
FIG. 4 is a sectional view taken along line IV—IV in FIG. 3.

As can be best ascertained from FIG. 3, the bevel gear drive 1 with the belt pulley is preferably horizontally displaceable within linear spherical sleeve guides 5. This facilitates a compensation between different stresses in the two V-belts, and allows an error angular running of the cardan shafts 2 and 9. However, the gear drive is also vertically adjustable by means of a vertical linear guide 5 which is pretensioned by a plate spring packet 8 with a degressive characteristic. This spring-loaded vertical guidance effects an automatic retensioning of the gradually slackening V-belts 3 within a certain range.

In the case of the horizontally and vertically adjustable bevel gear drive 1, the cardan shafts 2 and 9 are constructed so as to be adjustable in length.

For the two fans 12 an entire series of drive capabilities are available for driving them from the fan pulleys 6. Thus, for example, the fans can be driven through electromagnetic couplings, wherein the electromagnets respond at preselected temperatures. The invention also contemplates viscous couplings with different actuating temperatures, as well as with different drag speeds. The inventive concept also encompasses combinations of electromagnetic and viscous couplings, as well as a fixed fan drive with electromagnetic or viscous couplings.

What is claimed is:

1. A resistor-fan system for vehicles, such as buses having rear-mounted engines, comprising a first belt drive including V-belts for driving the fan of said system, a vehicle engine associated with said V-belt drive, and a bevel gear drive having an output coupling the V-belt drive on the fan with said engine, a first cardan shaft, a jackshaft, and a second V-belt drive at the engine for connecting the jackshaft to the output of said engine, said first cardan shaft being interconnected between said jackshaft and a power input end of said bevel gear drive, and a second cardan shaft coupled to the bevel gear drive at an end opposite the input end thereof, said system being arranged in a side panel of the vehicle proximate the rear end of the vehicle oriented substantially along the direction of vehicle travel, means for mounting the gear drive on the frame of the vehicle including a self-adjusting vertical linear guide and a self-adjusting horizontal linear guide for facilitating the sliding adjustment of the bevel gear drive and the first belt drive, including spring means for imparting spring tension to said vertical linear guide for effecting the self-adjusting thereof, said first and second cardan shafts being longitudinally adjustable, whereby said cardan shafts facilitate the adjustment of said bevel gear drive and belt drive relative to the frame of the vehicle.

2. System as claimed in claim 1, comprising at least one fan and associated radiators being jointly driven through said bevel gear drive.

3. System as claimed in claim 1, comprising a compressor for an air-conditioning system being driven by said second cardon shaft.

4. System as claimed in claim 1, wherein said bevel gear drive provides a plurality of differnt gear ratios.

5. System as claimed in claim 1, said spring tension means comprising a packet of plate springs having a degressive spring characteristic.

6. System as claimed in claim 1, wherein the components of said system comprising the radiator-fan, the first V-belt drive, and the bevel gear drive extend substantially along the vehicle axis in the direction of the vehicle travel.

* * * * *